C. J. HOLSLAG.
ALTERNATING CURRENT METALLIC ARC CUTTING AND WELDING APPARATUS.
APPLICATION FILED SEPT. 21, 1918.
1,305,363.
Patented June 3, 1919.
2 SHEETS—SHEET 1.
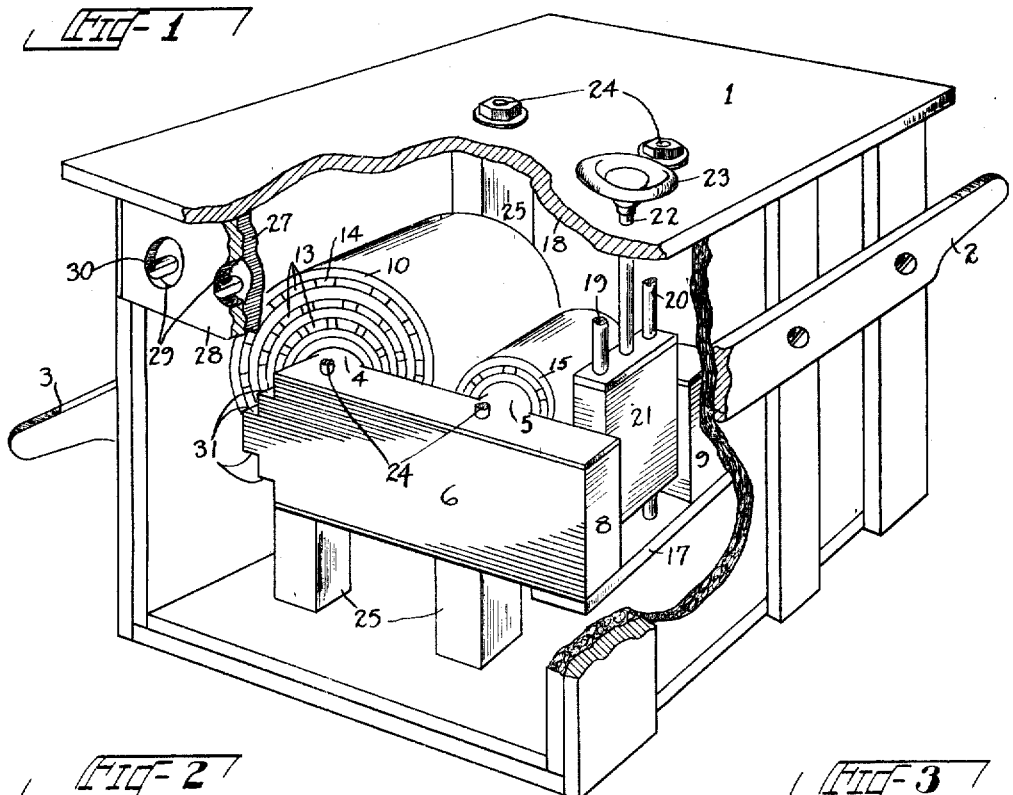
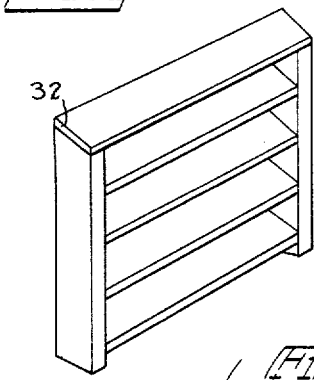
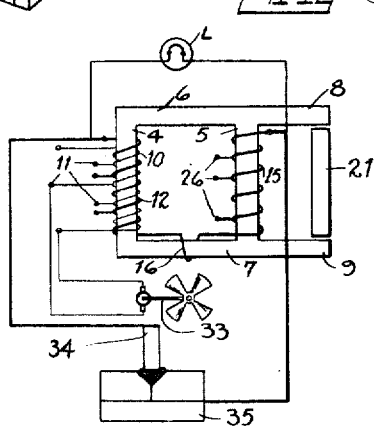
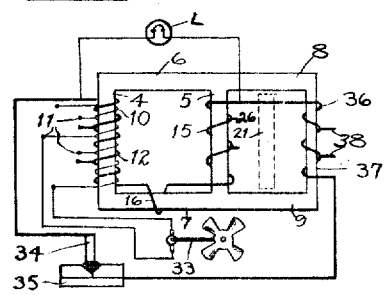
INVENTOR
CLAUDE J. HOLSLAG.
BY Albion D. T. Libby
ATTORNEY

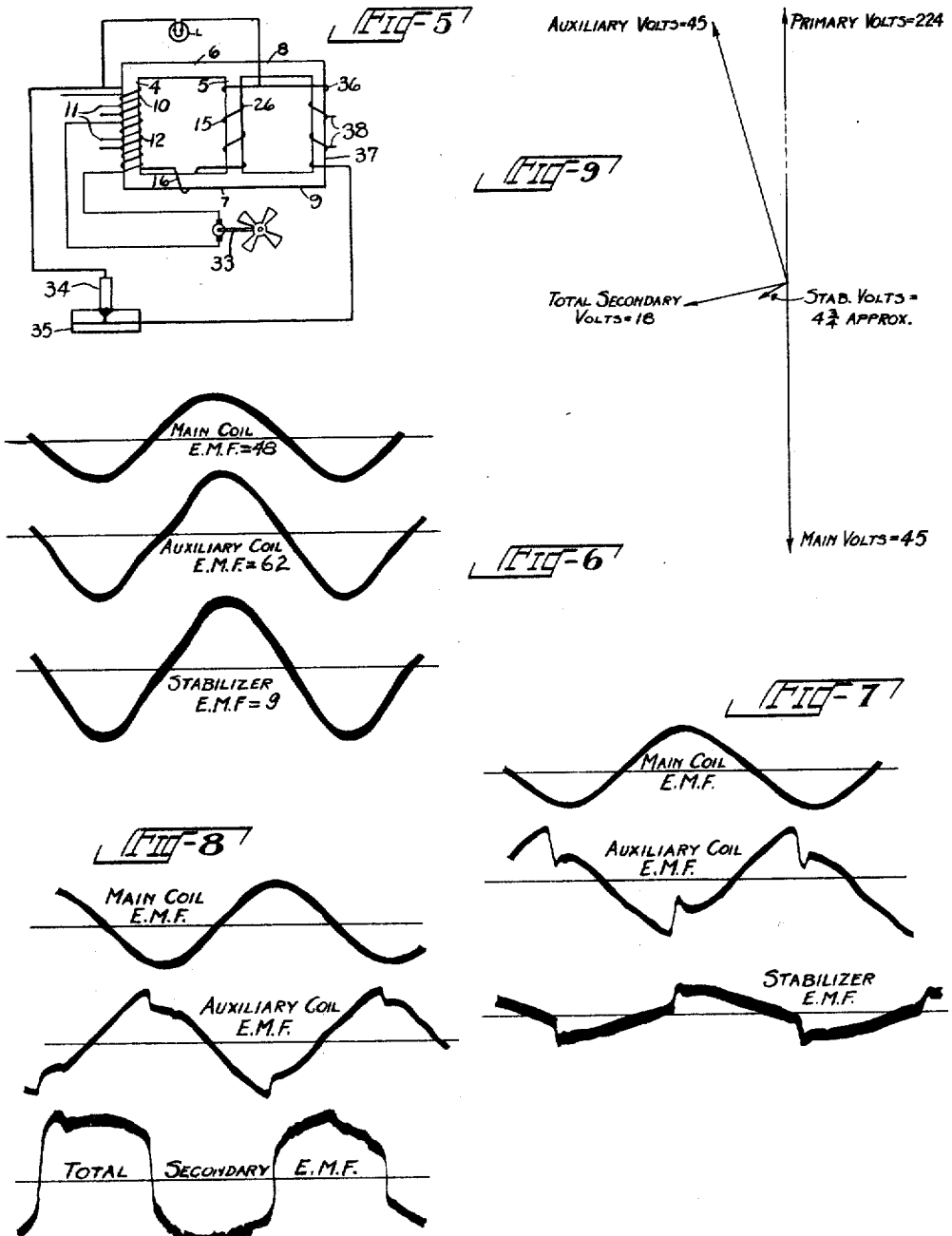

UNITED STATES PATENT OFFICE.

CLAUDE J. HOLSLAG, OF PEEKSKILL, NEW YORK.

ALTERNATING-CURRENT METALLIC-ARC CUTTING AND WELDING APPARATUS.

1,305,363.  Specification of Letters Patent.  Patented June 3, 1919.

Application filed September 21, 1918. Serial No. 255,077.

*To all whom it may concern:*

Be it known that I, CLAUDE J. HOLSLAG, a citizen of the United States, residing at Peekskill, in the county of Westchester and State of New York, have invented certain new and useful Improvements in Alternating-Current Metallic-Arc Cutting and Welding apparatus, of which the following is a specification.

In my application, Serial No. 231,681, filed April 30, 1918, I have shown and described a method of metallic arc cutting and welding by means of alternating current. In said application I set forth, the reasons why alternating current had not been used, previous to my invention described therein, also certain means together with the method of utilizing said means whereby alternating current can be used for metallic arc cutting, welding and repairing; hence I will not go into these details in this application, which has for its object a disclosure of a welding apparatus that has certain advantages hereinafter pointed out, over the apparatus shown and described in said application, all of which will be apparent to one skilled in the art after a study of the specification and drawing attached thereto, wherein—

Figure 1 is a perspective view of my welding apparatus with a portion broken away to show the adjacent interior parts.

Fig. 2 is a perspective view on a reduced scale of a section removed from the front of Fig. 1.

Fig. 3 is a diagrammatic view showing the disposal of the windings, etc., shown in assembled working relation in Fig. 1.

Fig. 4 is a modified form of transformer to give a lower open circuit voltage than the arrangement of Fig. 3.

Fig. 5 is a view similar to Fig. 4 without the mechanical flux diverter.

Fig. 6 is a reproduction from an oscillograph record of the E. M. F. wave forms of the three portions of the secondary winding of the device shown in Figs. 1 and 3, on open circuit or when welding operation is not going on.

Fig. 7 is a reproduction of an oscillograph record of the E. M. F.'s generated in the three secondary windings during the welding operation.

Fig. 8 is a reproduction of an oscillograph record during the welding operation, the lower curve being the secondary E. M. F. across the terminals of the transforming apparatus which corresponds to the arc voltage.

Fig. 9 is a diagram showing the phase relation of the various E. M. F.'s during one condition of welding.

Referring now to the details, wherein like numbers refer to corresponding parts in the various views, 1 illustrates a casing of any suitable material, wood being employed by me in commercial practice, the interior of which casing I prefer to line with asbestos. Attached to the casing 1 are handles 2 and 3 for the purpose of carrying the welding apparatus, it being understood from the view shown in Fig. 1 that two persons can readily pick up the apparatus by taking hold of the ends of the handles 2 and 3.

Mounted within the casing 1, but preferably spaced apart from the top, bottom and sides is a transforming device, shown as of the single phase type but I do not limit myself to such type, having a cast iron core with legs 4 and 5 joined by the portions 6 and 7 which have projecting arms 8 and 9. On the leg 4 is a primary winding 10 having taps 11 which are preferably brought out through the side of the casing in any suitable manner. The primary 10 is split up into different sections, as shown in Fig. 1, between which sections is intermingled a portion of the secondary winding 12, air spaces 13 being provided between the different sections by means of the spacers 14 which extend longitudinally of the coil. Another portion 15 of the secondary is wound on the leg 5 and is connected to the portion 12 through a steadying coil 16 hereinafter referred to. Air ducts may also be provided for this winding. The coil 16 is preferably placed on the rear section 7 of the core and therefore does not show in Fig. 1. Across the bottom side of the arms 8 and 9 is fastened a plate 17 which with the top portion 18 carries guide rods 19 and 20. The rods 19 and 20 support the flux controller 21 in operative position between the arms 8 and 9. The flux controller 21 is adjustable by means of a screw 22 and handle 23, which preferably projects to the exterior of the casing. I wish it to be understood that I may use a third leg of suitable cross section in the core of the transformer with a winding properly proportioned and connected to give the effect of the manual controller herein shown but which I prefer to use. I may also use a combination of the two as shown in Fig. 4, for very close adjustment.

The entire transforming device is supported within the casing 1 by means of four bolts 24, two of which are shown in the top part of the casing and the other two cut where they pass through the portion 6 of the core. The spacing members 25, three of which are shown, serve to hold the transforming device in spaced relation from the walls of the casing. The auxiliary secondary winding 15 has a suitable number of taps, indicated by 26, brought out to a terminal strip or block 27, which is preferably of slate, the same being mounted on the back of the wood strip 28 which has counterbored holes 29 to allow a suitable cable fastener to engage the terminals 30 to which the taps 26 are brought. A non-inductive resistance L, shown in the form of a lamp is also mounted on the strip 28 along with the terminals 30. The lamp L serves two functions, that of absorbing the kick voltage of the secondary winding of the transformer when the arc is broken and it also serves as a pilot light to indicate that current is on the secondary circuit after the primary switch is closed, thus telling the operator that the welding electrode, usually carried in a handle, is "alive" and ready.

The core of the transformer is constructed so that preferably the leg 4 which is encompassed by the primary coil 10 and main secondary coil 12, has air spaces 31 provided the entire length of the coil. The ends of the casing are provided with louvers 32 which are adapted to fit into preferably opposite ends of the box casing, the one in the front end of Fig. 1 fitting in between the strip 28 and the bottom of the casing. I mount, preferably, in the rear end of the casing, a small fan 33, tapping the same into the winding of the primary 10 as indicated in Fig. 3. This fan serves to draw air into one end of the casing and force it through the spaces 13 and 31 as well as around the outside of the windings and core on out through the other end of the casing which is constructed so that the welding apparatus may be used out of doors. One end of the winding 12 is shown connected to an electrode 34 and the other end of the auxiliary winding 15 connected to the work 35 that is to be welded or repaired.

Since the method of operation of my present invention is very similar to the method of operation of the transforming device which I have used extensively commercially and have described in my co-pending application hereinbefore referred to, it will not be referred to at length herein, except to emphasize certain details.

In the said application referred to, the auxiliary secondary winding of the transformer is farther away from the primary and main secondary, and the magnetic circuit is longer than in my present invention, also in the said application the flux controller is between the two coils, while in my present invention the flux controller, which is shown in Fig. 3 as of the manual type is between extensions which project beyond the coils. By this construction I have shortened the magnetic circuit and hence increased the working efficiency of my transforming device and besides reducing the open circuit voltage by reducing the ratio of primary and secondary turns and by using a smaller amount of iron and copper in this transformer as compared with the type shown in said application. By moving the auxiliary secondary coil closer to the main secondary coil and primary winding, as shown and described herein, I have found in practice that in certain classes of work the current through the arc varies more than in the type of apparatus shown and described in my previous application, and I have, in order to overcome this difficulty and steady the current through the arc, introduced a winding 16 of a suitable number of turns and which I preferably apply to the core sections 6 and 7 between the legs 4 and 5. In some cases I apply the winding 16 to but one core section and then preferably to the rear one 7 so as to get the most benefit of the cooling fan usually placed, when used, in the rear end of the casing and which increases the efficiency of the apparatus by keeping the temperature down. To make Fig. 1 of the drawing clearer the winding 16 is not shown on leg 6 and it is concealed from view on rear leg 7.

The magnetic conditions of the leg 4 carrying the primary and main secondary windings remains quite constant but the magnetic conditions of leg 5 and section or sections carrying winding 16 are variable depending on the secondary current or broadly stated, the magnetic flux threading windings 15 and 16 is variable, and the operative characteristics of the coils 15 and 16 therefore change with the flux in the primary leg core 4, and also in the core sections embraced by the coils 15 and 16 and it is these changes in operative characteristics which assist in holding the arc. In addition to their transformer action, the winding or windings 16 have a directive effect on the flux produced by the auxiliary secondary winding 15 which aids in the regulation. Stated in another way the relation of windings 15 and 16 to the primary and main secondary is such that when the moving electrode of a given size is in contact with the stationary electrode, the condition of a short circuit, the current in both primary and secondary is held to a predetermined maximum value and the constant part of the induced voltage is obtained from the main secondary coil 12 as the current through the windings 15 and 16, which is somewhat above the normal welding current, sets up magnetic fluxes which tend to prevent the primary flux from entering their respective core sections; but when the electrodes are separated, these windings having high operative characteristics act rapidly to produce a persistent arc that is easily drawn and maintained by the windings 15 and 16 then assisting the main secondary 12. When the arc is lengthened, by any cause, and the current tends to decrease the induced voltage in 15 and 16 increase and hence tend to prevent the reduction of the current, at the same time an induced flux from the primary enters the core sections on which windings 15 and 16 are wound producing a change in their operative characteristics which again tends to increase the voltage across the arc and thus to maintain a steady persistent arc. The disposition of the windings 15 and 16 with their respective magnetic circuits may take some other form and yet obtain similar results to the arrangement shown hence I do not limit my invention to one particular form.

From the curves shown in Fig. 6, the same being a reproduction of an oscillograph record taken from a transforming device such as shown in Fig. 1, it will be seen that on open circuit, that is with the welding operation suspended, the E. M. F.'s of the main auxiliary stabilizer coils constituting the windings 12, 15 and 16 are in phase and at the particular time when these curves were taken had effective values as marked on the drawing; namely 48, 62 and 9 volts. It will be seen that in order to make the stabilizer E. M. F. curve show on the oscillograph it was necessary to use a different degree of sensitiveness of the galvanometer and it is also to be understood that the curves are not for the purpose of showing the maximum or effective E. M. F.'s but rather their form and phase relationship.

In Fig. 7, which is a reproduction of an oscillograph record taken across the three portions of the secondary winding during welding operation, it will be seen that the E. M. F. of the auxiliary winding 15 has been shifted in phase about 160 degrees with respect to the E. M. F. of the main secondary winding 12 and that its form has changed, while the stabilizer or E. M. F. of winding 16 has changed its wave form materially but has been shifted only between 50 and 60 degrees with respect to the main secondary E. M. F. That is to say, under this particular condition of welding at the instant when the oscillograph record was taken the stabilizer E. M. F. was assisting the main secondary winding but it will be apparent that other conditions of welding may switch the stabilizer E. M. F. so that it will be assisting the auxiliary E. M. F.

In Fig. 8, which was taken under another condition of welding, it will be seen that the auxiliary E. M. F. is still further out of phase with the main E. M. F. than in Fig. 7 and the combination of the main auxiliary and stabilizer E. M. F. produces a total E. M. F. wave form which has the characteristic of changing suddenly from a prolonged maximum value of one polarity to a prolonged maximum value of opposite polarity, all as set forth more in detail in my copending application, Serial No. 231,681, filed April 30, 1918.

In Fig. 9, I have shown graphically the phase relationship and values of the various voltages of my transforming apparatus under a given welding condition. In this graphic representation it will be seen that the voltage of the auxiliary winding 15 may be changing and does change anywhere from phase position with the main secondary voltage to or beyond the position shown, and from what has been said before it is a variable and shiftable voltage depending on the welding condition. Likewise the stabilizer voltage is variable but not to the same extent as the auxiliary voltage and is more generally in phase with the resultant secondary voltage thereby producing a stabilizing action across the welding arc.

I may lower the open circuit voltage and also get regulation by the use of an arrangement shown in Fig. 4, wherein the arms 8 and 9 are extended farther out than in Fig. 3 and joined by a core section 37 of suitable cross section on which a winding 36 having taps 38 is placed and so proportioned that on open secondary circuit it subtracts its voltage from windings 10, 15 and 16, but under load it has no appreciable effect. To get very close regulation I can use the mechanical controller 21 in addition to the winding 36 as indicated in Fig. 4. In Fig. 5 I have shown an arrangement the same as in Fig. 4 but without the mechanical controller 21.

From the above description it will be apparent that I have provided an apparatus that can be quickly adapted to and moved in close proximity to the work, and one in which the part delivering the current has no continually moving parts to get out of order and one that is cheap to construct and easy to maintain and which has inherent regulating characteristics for welding, cutting and reducing. It will also be apparent that numerous changes and alterations may be made in the detail arrangement of parts and I do not, therefore, wish to be limited to the exact details shown and described, as the transformer may, as stated, be used in connection with a reducing furnace.

Having thus described my invention, what I claim is:—

1. Apparatus for metallic arc cutting and welding including a transformer having a closed circuit core, a primary winding on one leg of the core, a secondary winding having a main portion thereof intermingled with the primary winding and an auxiliary portion on another leg of the core and a flux controller exterior to the legs of the core.

2. Apparatus for metallic arc cutting and welding including a transformer having a closed circuit core with arms projecting beyond the legs of the core, a primary winding on one leg of the core, a secondary winding having a main portion thereof intermingled with the primary winding and an auxiliary portion on another leg of the core and an adjustable flux controller mounted between said arms.

3. Apparatus for metallic arc cutting and welding including a transformer having a closed circuit core, a primary winding on one leg of the core, a secondary winding having a main portion thereof intermingled with the primary winding and an auxiliary portion on another leg of the core, a flux controller exterior to the legs of the core, and one or more steadying windings on the core between said legs carrying the primary and auxiliary secondary winding.

4. Apparatus for metallic arc cutting and welding including a transformer having a closed circuit core with arms projecting beyond the legs of the core, a primary winding on one leg of the core, a secondary winding having a main portion thereof intermingled with the primary winding and an auxiliary portion on another leg of the core, an adjustable flux controller mounted between said arms, and a steadying winding on the core between said legs carrying the primary and auxiliary secondary winding.

5. Apparatus for metallic arc cutting and welding including a transformer having a closed circuit core with arms projecting beyond the legs of the core, a primary winding on one leg of the core, a secondary winding having a main portion thereof intermingled with the primary winding and an auxiliary portion on another leg of the core, the primary and both portions of the secondary windings having means for varying the effective number of turns and a flux controller mounted between said arms.

6. Apparatus for metallic arc cutting and welding including a transformer having a closed circuit core, a primary winding on one leg of the core, a secondary winding having a main portion thereof intermingled with the primary winding and an auxiliary portion on another leg of the core, a flux controller exterior to the legs of the core, and a steadying winding on the core between said legs carrying the primary and auxiliary secondary winding, both primary and secondary windings having means for varying their effective number of turns.

7. Apparatus for metallic arc cutting and welding including a transformer, a casing for supporting and inclosing the transformer and having handles for moving the casing and transformer, openings in the ends of the casing for the passage of air and means within the casing for forcing air therethrough.

8. Apparatus for metallic arc cutting and welding including a transformer, a portable casing for supporting, inclosing and moving the transformer, said transformer having a closed circuit core with arms projecting beyond one of the core legs, windings disposed on the core legs, guide rods supported by and between said core arms and said casing, a flux controller carried on said guide rods and having an adjustable handle exterior to said casing and ventilating means in the walls of said casing.

9. Apparatus for metallic arc cutting and welding including a transformer, a portable casing for supporting, inclosing and moving the transformer, said transformer having a core with primary and secondary windings thereon in inductive relation to each other, a flux controller supported by the transformer core and casing, means for adjusting the flux controller and ventilating means including a part of the casing for the transformer inside the casing.

10. Apparatus for electric arc cutting and welding including a transformer having primary and secondary windings in inductive relation to each other, a portion of thee secondary being in intimate relation with the primary while the balance of the secondary is remote therefrom, a steadying winding in series with both portions of the secondary and disposed in inductive relation to both primary and secondary windings and an adjustable flux controller for varying the inductive effects of said windings.

11. Apparatus for electric arc cutting and welding including a transformer, a casing for supporting, inclosing and moving the transformer, said transformer having a core with primary, secondary and stabilizing windings thereon, an adjustable flux controller supported by the core and casing for varying the inductive effects of said windings, a terminal strip attached to said casing and having terminals mounted thereon, said terminals being connected to different portions of the secondary windings whereby various current values may be obtained for the purpose described.

12. Apparatus for electric arc cutting and welding including a transformer, a casing having handles extending along opposite sides thereof, for supporting the transformer in spaced relation from its walls, said transformer having primary and secondary windings arranged on the core so that air spaces are left between different sections of winding and said windings and core, and means for circulating air through said air spaces and out of the casing.

13. Apparatus for metallic arc cutting and welding including a transformer having a closed circuit core, a primary winding on one leg of the core, a secondary winding having a main portion thereof intermingled with the primary winding and an auxiliary portion on another leg of the core and a flux controller constructed and arranged to act on the main flux path outside the regular magnetic circuit embraced by the said windings.

14. Apparatus for metallic arc cutting and welding including a transformer having a closed circuit core, a primary winding on one leg of the core, a secondary winding having a main portion thereof intermingled with the primary winding and an auxiliary portion on another leg of the core and a manually operable flux controller constructed and arranged to act on the regular magnetic circuit embraced by said windings outside of the location of said windings on the transformer core.

15. Apparatus for electric arc cutting and welding including an alternating current transformer having a closed circuit core, a primary winding on one leg of the core, a main secondary winding closely intermingled with the primary, an auxiliary secondary winding on another leg of the core adjacent the leg carrying the primary and main secondary and means acting on the core exterior to the location of said windings for controlling the flux through said core legs.

16. Apparatus for electric arc cutting and welding including an alternating current transformer having a closed circuit core, a primary winding on one leg of the core, a main secondary winding closely intermingled with the primary, an auxiliary secondary winding on another leg of the core adjacent the leg carrying the primary and main secondary and means acting on the core exterior to the location of said windings for controlling the flux through said core legs, and a stabilizing winding disposed on the core between the said legs carrying the primary and secondary windings.

17. Apparatus for metallic arc cutting and welding including an alternating current transformer constructed to generate the cutting or welding voltage directly at the terminals of the cutting or welding electrode and means for indicating when said electrodes are "alive."

18. Apparatus for metallic arc cutting and welding including an alternating current transformer constructed to generate the cutting or welding voltage directly at the terminals of the cutting or welding electrode and means for visually indicating when said electrodes are alive.

19. Apparatus for metallic arc cutting and welding including an alternating current transformer constructed to generate the cutting or welding voltage directly at the terminals of the cutting or welding electrode and means for absorbing the kick voltage when the arc between said electrodes is ruptured.

20. Apparatus for metallic arc cutting and welding including an alternating current transformer constructed to generate the cutting or welding voltage directly at the terminals of the cutting or welding electrode and combined means for indicating when said electrodes are "alive" and for absorbing the "kick" voltage when the arc between said electrodes is ruptured.

21. An electric arc cutting, welding and reducing apparatus comprising an alternating current transformer having preferably a closed circuit core, a primary winding on one leg of the core, a secondary winding having a portion closely associated with the primary winding and an auxiliary portion on another part of the core, one or more steadying windings on another portion of the core acting with said auxiliary winding to limit the primary and secondary current to a certain predetermined value on short circuit and further acting to help draw and sustain an arc.

22. An electric arc cutting, welding and reducing apparatus comprising an alternating current transformer having preferably a closed circuit core, a primary winding on one leg of the core, a secondary winding having a portion closely associated with the primary winding and an auxiliary portion on another part of the core, one or more steadying windings on another portion of the core serving to direct the flux set up by said auxiliary winding whereby the regulation of the welding arc is improved.

23. An electric arc cutting, welding and reducing apparatus comprising an alternating current transformer having a magnetizable core with a primary winding thereon; a winding, on the core in the secondary circuit including the arc electrodes, acted on by the primary winding to generate substantially a constant part of the secondary working E. M. F. and a plurality of other windings on the core in the secondary circuit to generate E. M. F.'s which act to modify the effect of the first mentioned E. M. F. to maintain a steady arc.

24. An electric arc cutting, welding and reducing apparatus comprising an alternating current transformer having a magnetizable core with means on the core adapted to be connected to a source of primary current for energizing said core; secondary windings on the core connected to arc electrodes, one of said windings being subjected directly to the influence of the primary energizing means to furnish the constant part of the induced E. M. F. in the secondary circuit, another secondary winding indirectly subjected to the influence of the primary energizing means to supply an E. M. F. which acts to limit the amount of current which will flow in the secondary circuit and which further assists in producing a persistent arc when the same is "struck" and steadying windings on the core for assisting the last mentioned secondary winding in its functions.

25. An electric arc apparatus comprising an alternating current transformer having a core with a primary winding thereon; a subdivided secondary, the terminals of which are connected to the arc electrodes, one portion of said secondary being intimately associated with said primary to generate the constant portion of the working E. M. F., another portion of the secondary arranged on the core separated from the primary for generating a varying E. M. F. to regulate the watts used at the arc and steadying windings on the core for generating varying E. M. F.'s to assist the second portion of the secondary in its work of regulating the arc and means separate from all of said windings for adjusting the flux through that portion of the secondary separated from the primary and the steadying windings.

26. An electric arc cutting, welding and reducing machine comprising an alternating current transformer having a core and a primary winding thereon; a secondary winding having, first a part wound on the core in such relation to the primary that the reactance factor between the two windings is relatively low and secondly, a part arranged on the core so that it has a relatively high and variable reactance factor with respect to the primary and first mentioned part of the secondary; with additional coils on said core having variable reactances to assist the secondary in maintaining a steady arc.

27. An electric arc apparatus comprising an alternating current transformer having a core with a primary winding thereon; a subdivided secondary, the terminals of which are connected to the arc electrodes, one portion of said secondary being intimately associated with said primary to generate the constant portion of the working E. M. F., another portion of the secondary arranged on the core separated from the primary for generating a varying E. M. F. to regulate the watts used at the arc and steadying windings on the core for assisting either portion of the secondary in its work.

In witness whereof, I affix my signature.

CLAUDE J. HOLSLAG.

Copies of this patent may be obtained for five cents each, by addressing the "Commissioner of Patents, Washington, D. C."